United States Patent
Yang et al.

(10) Patent No.: US 6,744,649 B1
(45) Date of Patent: Jun. 1, 2004

(54) ZERO SWITCHING POWER CONVERTER OPERABLE AS ASYMMETRICAL FULL-BRIDGE CONVERTER

(75) Inventors: Ta-yung Yang, Milpitas, CA (US); Jenn-yu G. Lin, Taipei (TW); Chern-Lin Chen, Taipei (TW)

(73) Assignee: System General Corp., Taipei Hsien (TW)

( * ) Notice: Subject to any disclaimer, the term of this patent is extended or adjusted under 35 U.S.C. 154(b) by 0 days.

(21) Appl. No.: 10/248,206

(22) Filed: Dec. 27, 2002

(51) Int. Cl.⁷ .............................................. H02M 3/24
(52) U.S. Cl. ............................ 363/98; 363/132; 363/41
(58) Field of Search ........................... 363/98, 132, 17, 363/56.02, 56.03, 56.04, 56.05, 41

(56) References Cited

U.S. PATENT DOCUMENTS

| | | | |
|---|---|---|---|
| 4,700,287 A | * 10/1987 | Nilssen | 363/132 |
| 4,855,888 A | 8/1989 | Henze et al. | 363/17 |
| 4,967,332 A | * 10/1990 | Claydon et al. | 363/17 |
| 5,189,602 A | * 2/1993 | Callier et al. | 363/28 |
| 5,442,540 A | 8/1995 | Hua et al. | 363/98 |
| 5,859,771 A | * 1/1999 | Kniegl | 363/132 |
| 5,959,857 A | * 9/1999 | Nagahara | 363/132 |
| 5,973,939 A | 10/1999 | Tan | 363/21 |
| 6,069,798 A | 5/2000 | Liu | 363/16 |
| 6,191,960 B1 | 2/2001 | Fraidlin et al. | 363/25 |
| 6,195,270 B1 | * 2/2001 | Wittenbreder | 363/17 |
| 6,356,462 B1 | 3/2002 | Jang et al. | 363/17 |

OTHER PUBLICATIONS

Laszlo Balogh, "The New UC3879 Phase–Shifted PWM Controller Simplifies The Design Of Zero Voltage Transistion Full–Bridge Converters", no date, U–154, Unitrode Corporation, pp. 1–8.*

* cited by examiner

*Primary Examiner*—Shawn Riley
(74) *Attorney, Agent, or Firm*—Jiang Chyun IP Office

(57) ABSTRACT

A pulse width modulated soft-switching power converter, having a pair of main switches and a pair of auxiliary switches coupled to the primary winding of the transformer. The main switches and auxiliary switches intermittently conduct an input voltage source to the primary winding to operate the soft-switching power converter in four operation stages in each switching cycle. The main switches conduct the input voltage source to the transformer in a first operation stage. In a second operation stage, the conduction is cut off. The transformer operates as an inductor with the auxiliary switches switched on under zero-voltage or zero-current switching mode in a third operation stage. In the fourth operation stage, the auxiliary switches are switched off, whereby the flyback energy achieves the zero-voltage transition. A zero-voltage-detection is employed to optimize the zero-voltage switching. The switching frequency is decreased in response to the decrease of the load. Furthermore, the auxiliary switching is restricted in accordance with the decrease of the load. Therefore reducing the power consumption in the light load and no load conditions.

13 Claims, 12 Drawing Sheets

US 6,744,649 B1

ZERO SWITCHING POWER CONVERTER OPERABLE AS ASYMMETRICAL FULL-BRIDGE CONVERTER

BACKGROUND OF INVENTION

Field of Invention

The present invention relates in general to a pulse width modulation (PWM) power converter, and more particularly, to a pulse width modulation power converter using zero voltage switching technique and power saving means.

Power converters have been frequently used to convert an unregulated power source into a constant voltage source. Transformers having a primary winding and a secondary winding are the hearts of most power converters. Typically a switching device is connected to the primary winding to control energy transferred from the primary winding to the second winding and output therefrom. Currently, under the control of the switching device, the pulse width modulation power converter can be operated at a constant high frequency with reduced size and weight. However, such a power converter suffers from the issues of switching loss, component stress and noise, and electromagnetic interference (EMI).

To resolve the switching loss problem of the pulse width modulation power converters, a phase-shift scheme for soft switching operation has been proposed, particularly for the high-frequency power conversion. For example, the full-bridge (FB) quasi-resonant zero-voltage switching (ZVS) technique has been disclosed in U.S. Pat. No. 4,855,888, "Constant frequency resonant power converter with zero-voltage switching", issued to Christopher P. Henze, Ned Mohan and John G. Hayes at Aug. 8, 1989, U.S. Pat. No. 5,442,540, "Soft-switching PWM converters" issued to Guichao C Hua and Fred C. Lee at Aug. 15, 1995, and "Soft-switched full-bridge converters" disclosed by Yung-taek Jang and Milan M. Jovanovic at Mar. 12, 2002. In U.S. Pat. No. 5,973,939, "Double forward converter with soft-PWM switching" issued to F. Don Tan at Oct. 26, 1999 and U.S. Pat. No. 6,191,960, "Active clamp isolated power converter and method of operating thereof" issued to Simon Fraidlin and Anatoliy Polikarpov at Feb. 20, 2001, the active clamp technique has been employed in the forward zero-voltage switching power converters. In U.S. Pat. No. 6,069,798, "Asymmetrical power converter and method of operation thereof" issued to Rui Liu at May 30, 2000, an asymmetrical scheme has been developed for a half-bridge (HB) topology.

Among various zero-voltage switching power converters, a parasitic leakage inductor of the transformer or at least one additional magnetic component is used as a resonant inductor or switch to generate a circulating current, so as to achieve the zero-voltage transition and switching operation. The parasitic leakage inductor of the transformer or the additional magnetic component, though providing the aid of zero-voltage transition and switching, consequently increases switching stress and noise.

Further, in such an approach, power consumption caused by circulating current is significantly high in the light load or zero-load condition.

SUMMARY OF INVENTION

The present invention provides a zero-voltage switching pulse width modulation power converter for high frequency operation. The zero-voltage switching pulse width modulated power converter is operated at a constant high frequency with low switching loss, low stress, and low noise.

The present invention further provides a zero-voltage switching pulse width modulation power converter that can realize a zero-voltage transition and switching operation without using an additional magnetic device or leakage inductor of the transformer.

The present invention also provides a zero-voltage switching pulse width modulation power converter that consumes relatively low power in the light load and zero-load conditions.

Further, the present invention provides a control scheme to optimize soft switching of a power converter.

The zero-voltage switching pulse width modulation power converter provided by the present invention comprises a transformer, a primary circuit, and a secondary circuit. The transformer has a primary winding coupled to the primary circuit and a secondary winding coupled to the secondary circuit. The zero-voltage switching pulse width modulation further comprises a feedback circuit, coupled to an output of the secondary circuit to generate a feedback voltage. The primary circuit further comprises a controller coupled to the feedback voltage. The controller is operative to conduct the primary winding to an input voltage source in response to the feedback circuit. In addition, the primary circuit further comprises a pair of main switches and a pair of auxiliary switches.

The soft-switching power converter further comprises a timing resistor coupled to the controller to adjust a pulse width of the second switching signal, a programming resistor coupled to the controller to determine a pulse width of the second switching signal as a function of a load of the power converter, and the controller may further comprise a reference resistor to determine a switching frequency of the power converter.

The controller is operative to generate the first and the second switching signals, such that each switching cycle of the power converter comprises four operation stages. In the first operation stage, the controller conducts the input voltage source and the primary winding via the main switches by generating the first switching signal. In the second operation stage, the controller switches off the first switching signal. In the third operation stage, the controller generates a second switching signal to conduct the input voltage source to the primary winding via the auxiliary switches. In the fourth operation stage, the second switching signal is switched off.

The present invention further provides a controller comprising an oscillator, an inverter, first to second comparators, first to third D-type flip-flops, and a first AND gate and a second AND gate. The oscillator is operative to generate a clock signal, a ramp signal and a saw signal. The inverter has an input terminal receiving the clock signal and an output terminal. The first comparator has a positive terminal connected to a feedback voltage obtained from an output voltage of the power converter, a negative terminal coupled to the ramp signal, and an output terminal. The second comparator has a positive terminal coupled to a variable current, a negative coupled to the saw signal, and an output terminal. A variable current flows through the timing resistor form the variable voltage that compares with the saw signal to produce a signal for generating the second switching signal. The first D-type flip-flop is coupled to the output terminals of the inverter and the first comparator and a voltage source. The first D-type flip-flop further comprises an output. The second D-type flip-flop is coupled to the output terminals of the inverter and the second comparator and the voltage source, and the second D-type flip-flip further comprises an output. The third D-type flip-flop is coupled to the output terminal of the inverter, and the third D-type flip-flop has a first output and a second output inverted from the first output. The first output of the third D-type flip-flop output a first enable signal for the first switching signal. The second output of the third D-type flip-flop output a second enable signal for the second switching signal. The first AND gate is coupled to the outputs of the first D-type flip-flop and the inverter, and the first enable signal. The second AND gate is coupled to the outputs of the second D-type flip-flop and the inverter, and the second enable signal. The first AND gate generates a first switching signal to drive the main switches, and the second AND gate generates the second switching signal to drive the auxiliary switches.

The controller further comprises a variable current source to generate the variable current. The variable current source comprises a programmable current, an I/V resistor, an op-amplifier, a constant current source, a pair of mirrored transistors and a transistor. The programmable current flowing through the I/V resistor generates a voltage that is connected to the positive input terminal of the op-amplifier. The negative input terminal of the op-amplifier is connected to the transistor and the programming resistor, wherein the programming resistor determines a pulse width of the second switching signal as a function of a load of the power converter. The pair of mirrored transistors is connected to the constant current source. The transistor is coupled to one of the mirrored transistors. Another mirrored transistor outputs the variable current.

The oscillator comprises a reference voltage, a mirrored transistor, a transistor and an op-amplifier to generate a reference current through the reference resistor.

The op-amplifier is coupled between the reference voltage, the transistor and the resistor. The transistor is coupled to one of the mirrored transistor to generate the reference current.

The oscillator further comprises three mirrored transistors, a transistor, a first and second op-amplifiers, a resistor and a constant current source mirrored from the reference current. Three mirrored transistors are connected to the constant current source. The transistor is coupled to the first mirrored transistor. The first op-amplifier is coupled between the transistor and the feedback voltage. The resistor is coupled to the transistor and the first op-amplifier. The second op-amplifier is coupled to the resistor and a threshold voltage. The second mirrored transistor outputs the programmable current. The third mirrored transistor outputs a programmable discharge current. The programmable current and the programmable discharge current are proportional to a mirror ratio of the mirrored transistors and the difference between the feedback voltage and the threshold voltage, and inversely proportional to resistance of the resistor. Due to the feedback voltage is decreased in response to the decrease of the output load of the power converter, therefore the programmable current and the programmable discharge current are reduced in light load and no load conditions.

The oscillator further comprises a frequency capacitor, operative to determine operation frequency. The reference current mirrors a charge current that associates with the frequency capacitor generate the ramp signal and determine the maximum on-time of the first switching signal. The oscillator further comprises first-pair of mirrored transistor and second-pair of mirrored transistor, a first-disable transistor and second-disable transistor for the control of discharge current. The reference current further mirrors a discharge current that flows through the second-pair of mirrored transistor to discharge the frequency capacitor, wherein the discharge current is enabled by a second discharge signal via the second-disable transistor. The discharge current associates with the frequency capacitor determine the off-time of the second switching signal. The programmable discharge current that flows through the first-pair of mirrored transistor to discharge the frequency capacitor, wherein the programmable discharge current is enabled by a first discharge signal via the first-disable transistor. The programmable discharge current associates with the frequency capacitor determine the off-time of the first switching signal. Since the programmable discharge current is reduced in accordance with the decrease of the load in light load condition, the off-time of the first switching signal is increased accordingly. In the meantime the off-time of the second switching signal is keep as a constant, which maintains a short delay time for achieves the zero voltage transition before the start of next switching cycle. Consequently, the off-time of the first switching signal is increased, the switching frequency of the switching signal is decreased and thus the switching losses and the power consumption of the power converter is reduced in light load and no load conditions.

The oscillator further comprises three comparators, four NAND gates, a NOR gate, a transistor, a current source, a switch, a capacitor, and a release current that is mirrored by the reference current. The negative input terminal of first comparator and the positive input terminal of second comparator are connected to the frequency capacitor. In order to determine the switching frequency and the ramp signal, the positive input terminal of first comparator and the negative input terminal of second comparator are connected to a high threshold voltage and low threshold voltage respectively. The first and second NAND gates form a S-R latch circuit. The input of the first and second NAND gate is connected to the output of the first and second comparator respectively. The first NAND gate outputs a clock signal that is connected to the input of third and fourth NAND gates. The first and second enable signal applied to the third and fourth NAND gates to generate the first discharge signal and the second discharge signal for the off-time control of the first and second switching signal. The clock signal is also applied to turn on the switch, which associates with the release current and the capacitor produce the saw signal. Accordingly, the saw signal is used to compare with the variable voltage to generate the signal for the second switching signal. The positive input terminal of the third comparator is connected to the current source and the detection diode for the detection of zero voltage transition. The current source is used for pull-high. The negative input terminal of the third comparator is coupled to a threshold voltage. Once a low signal is detected by the third comparator, during the period of second switching signal, the transistor will be turned on by the NOR gate to rapidly discharges the frequency capacitor and starts the next switching cycle in time. Therefore the zero voltage switching is achieved and the efficiency of the power converter is improved.

Advantageously, the zero-voltage switching PWM power converter of the invention is operated at a constant high frequency with low switching loss, low stress, and low noise. The zero-voltage switching PWM power converter can realize a zero-voltage transition and switching operation without using an additional magnetic device or leakage inductor of the transformer. It consumes relatively low power in the light load and zero-load conditions.

BRIEF DESCRIPTION OF DRAWINGS

The accompanying drawings are included to provide a further understanding of the present invention, and are incorporated in and constitute a part of this specification. The drawings illustrate embodiments of the present invention and, together with the description, serve to explain the principles of the present invention. In the drawings.

DETAILED DESCRIPTION

Figure 1:
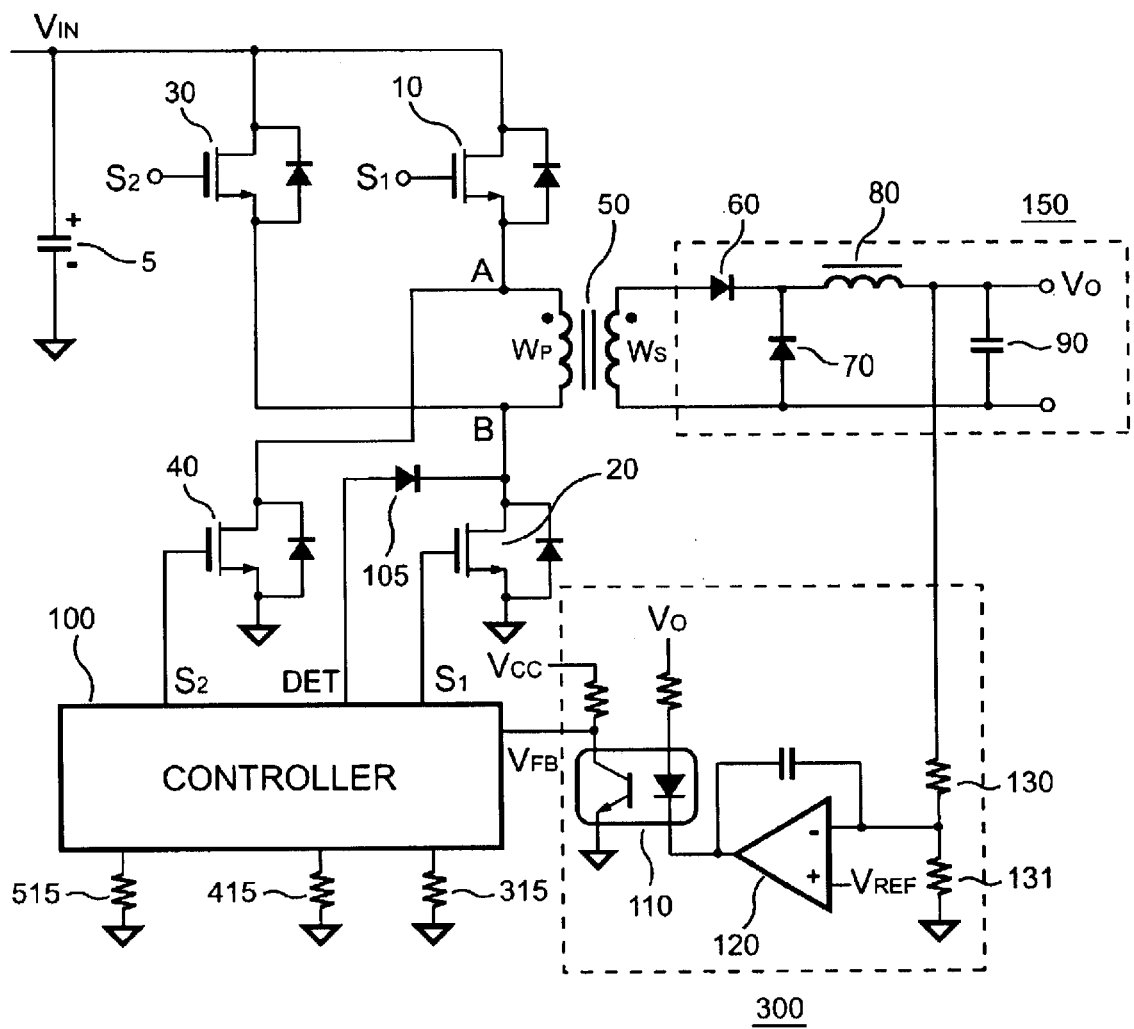
FIG. 1 is a circuit diagram of a soft-switching power converter according to the present invention.

FIG. 1 shows a circuit diagram of a soft-switching power converter provided by the present invention. As shown in FIG. 1, the soft-switching power converter comprises a transformer 50, a pair of main switches 10 and 20, a pair of auxiliary switches 30 and 40, and a secondary circuit 150. The transformer 50 further comprises a primary winding Wp coupled to the main and auxiliary switches 10, 20, 30 and 40, while the secondary winding Ws is coupled to the secondary circuit. More specifically, in this embodiment, the main switches 10 connect the primary winding Wp to an input voltage source $V_{IN}$ from a node A of one end of the primary winding Wp, and the node A is further connected to the auxiliary switch 40. From a node B at the other end of the primary winding Wp, the auxiliary switch 30 connects the input voltage source $V_{IN}$ to the primary winding Wp, and the main switch 20 is further connected to the primary winding Wp therefrom. The main and auxiliary switches 10, 20, 30 and 40 can include metal-oxide semiconductor field effect transistors (MOSFET), insulated gate bipolar transistors (IGBT), and gate-turn-off transistors (GTO), for example. As shown in FIG. 1, the input voltage source $V_{IN}$ is further connected to a capacitor 5.

The secondary circuit 150 comprises a half-rectifier, which is assembled by a diode 60, preferably a rectifying diode and a diode 70, frequently referred as a freewheel diode or a reverse diode relative to the diode 60. The secondary circuit 150 further comprises an inductor 80 and a capacitor 90. The positive terminal of the diode 60 is coupled to one end of the secondary winding Ws, and the positive terminal of the diode 70 is coupled to the other end of the secondary winding Ws. The inductor 80 is connected between the negative terminals of the diodes 60 and 70. The capacitor 90 has one terminal connected to the positive terminal of the diode 70 and the other end connected between the inductor and the output terminal of the secondary circuit.

Figure 2:
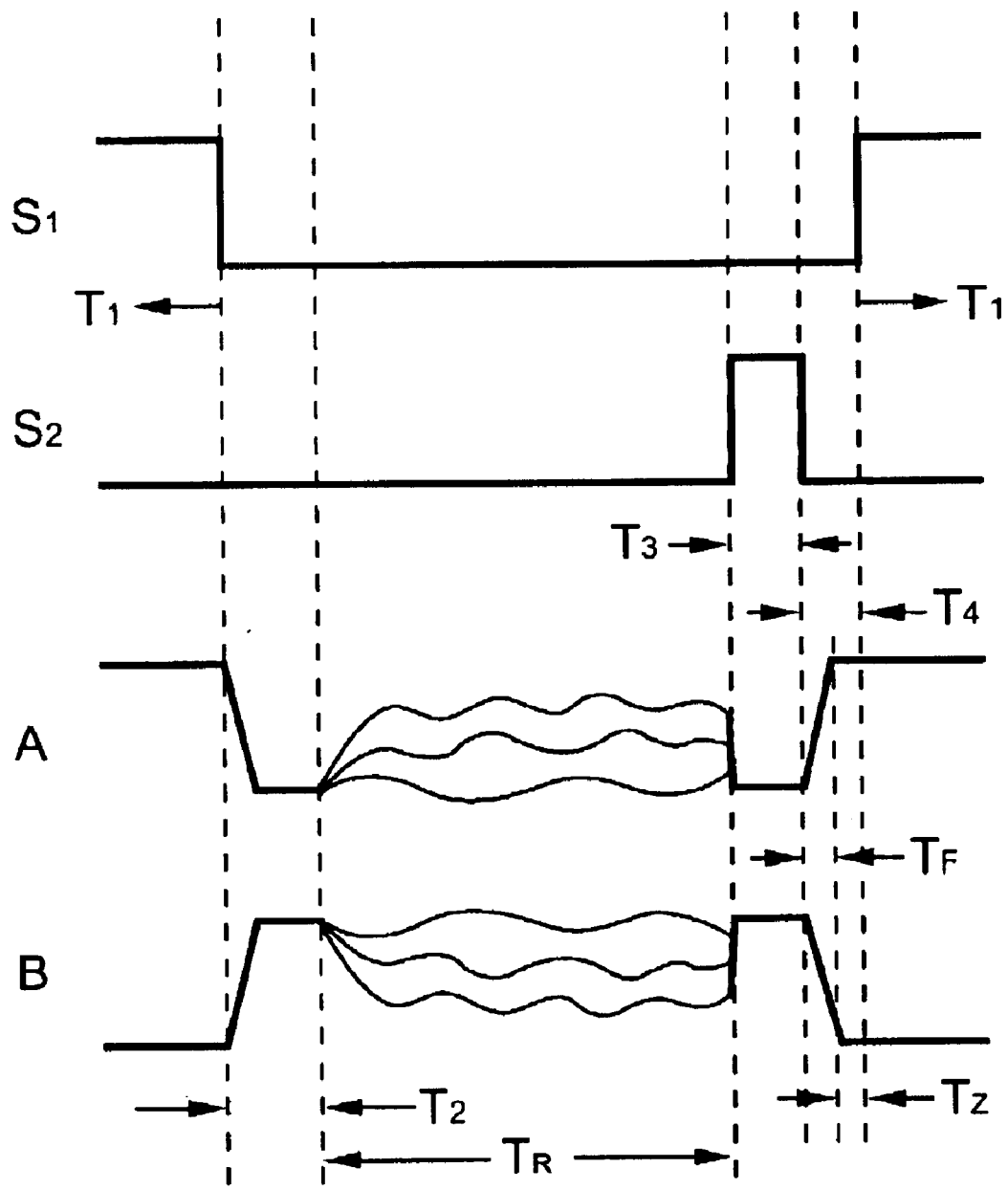
FIG. 2 shows the waveforms in various operation stages of each switching cycle of the soft-switching power converter as shown in FIG. 1.

As shown in FIG. 1, the main switches 10 and 20 are driven by a switching signal $S_1$, while the auxiliary switches 30 and 40 are driven by a switching signal $S_2$. Referring to FIG. 2, the switching signal $S_1$ is preferably a pulse signal with a pulse width $T_1$, and the switching signal $S_2$ is preferably a pulse signal with a pulse width $T_3$. The soft-switching power converter further comprises a controller 100 for generating the switching signals $S_1$ and $S_2$, and a feedback circuit 300 coupled to the output terminal of the secondary circuit to supply a feedback voltage $V_{FB}$ to the controller 100 in response to the output voltage $V_O$ of the power converter.

The feedback circuit 300 comprises an error amplifier 120 and a photo-coupler 110. Via resistors 130 and 131, the output voltage $V_O$ of the secondary circuit 150 is fed into the error amplifier 120 from a negative input terminal thereof and compared to a reference voltage $V_{REF}$. Being compared and amplified by the error amplifier 120, a feedback voltage $V_{FB}$ is input to the controller 100 via the photo-coupler 110.

As shown in FIG. 1, the controller 100 is connected to resistors 315, 415, 515, the feedback voltage $V_{FB}$, the main switches 10, 20, the auxiliary switches 30, 40, and a diode 105 with a negative terminal coupled between the node B and the main switch 20. The resistor 315 is adjustable to determine the pulse width $T_3$ of the switching signal $S_2$ for driving the auxiliary switches 30 and 40. According to the voltage across the resistor 415, the variation range of the feedback voltage $V_{FB}$ is determined, such that the pulse $T_3$ of the switching signal $S_2$ can be further adjusted as a function of the load connected to the output terminal of the secondary circuit 150, from which the output voltage $V_O$ of the power converter is output. By adjusting the resistance of the resistor 515, the switching frequency of the power converter can be determined. A detailed description of various components of the controller 100 will be further described later in this specification.

By controlling the on/off status of the main and auxiliary switches 10 to 40, the power converter as shown in FIG. 1 has four operation stages in each switching cycle as shown in FIG. 2 and FIGS. 3a to 3d. In addition, in order to operate the power converter in four operation stages for each cycle, the switching signals $S_1$ and $S_2$ have to be out of phase. For example, in the embodiment as shown in FIG. 1 and FIG. 2, the main switches 10 and 20 are conducted when the switching signal $S_1$ is high during $T_1$ for each switching cycle. During duration $T_1$, the auxiliary switches 30 and 40 are switched off. When the switching signal $S_1$ has been switched off for a period of time, that is, for $T_2$ as shown in FIG. 2, the auxiliary switches 30 and 40 are conducted for a period of time $T_3$.

Figure 3A:
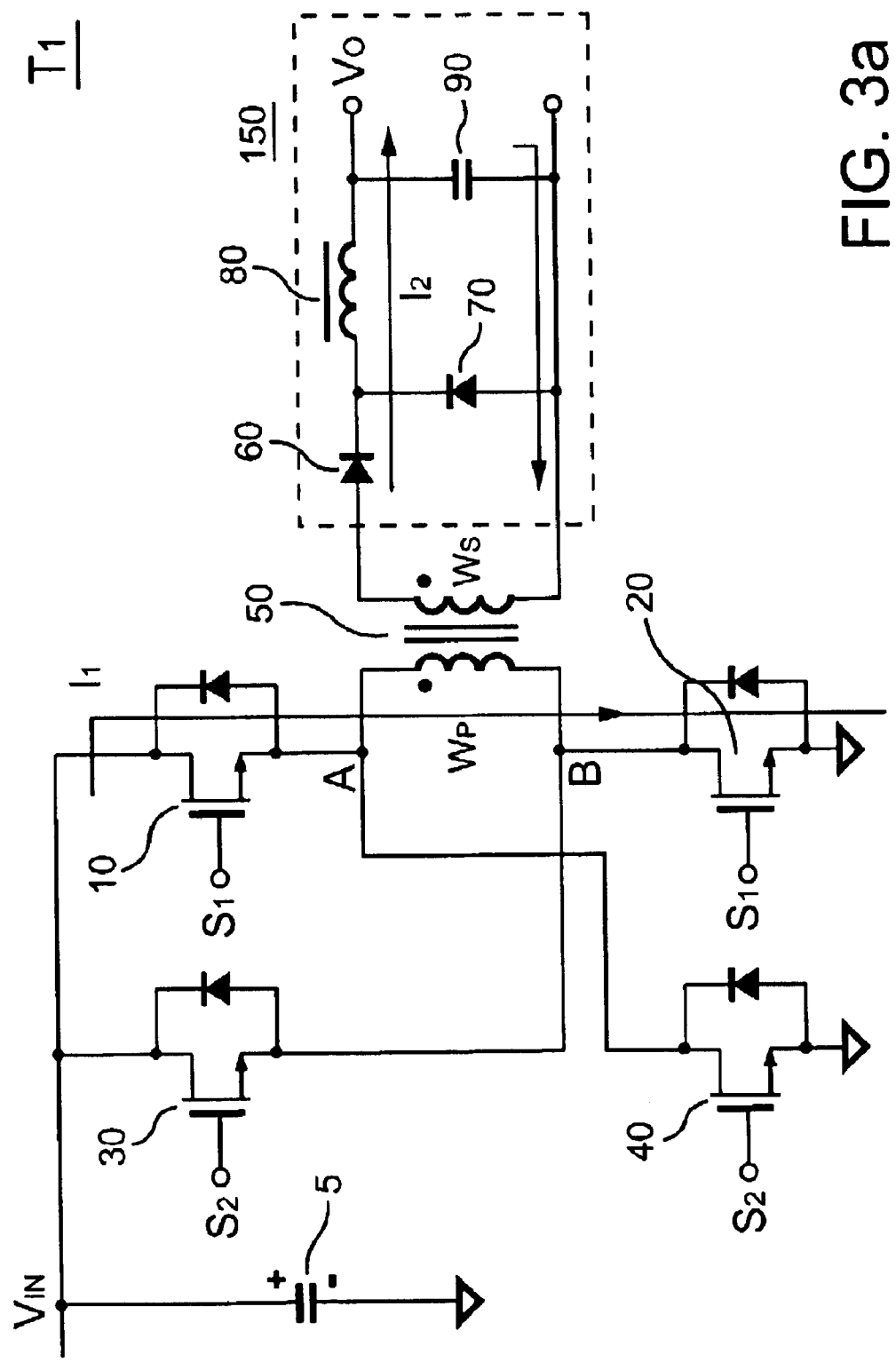
FIG. 3a shows the current flow of the soft-switching power converter as shown in FIG. 1 in a first operation stage of one switching cycle.

The four operation stages are further described with reference to FIGS. 2 and 3a to 3d as follows. At the beginning of each switching cycle, as shown in FIG. 2, the main switches 10 and 20 are switched on for the pulse width $T_1$ of the switching signal $S_1$. As the main switches 10 and 20 are activated, as shown in FIG. 3a, the current $I_1$ flows from the input voltage $V_{IN}$ through the main switches 10 and 20 across the primary winding Wp. Therefore, the energy is delivered from primary circuit to secondary circuit. Meanwhile, the polarity of the primary winding Wp and the secondary winding Ws conduct the rectifying diode 60 by supplying a forward bias thereto, while the freewheel diode 70 is cut off due to the reverse bias supplied thereto. As a result, a secondary current $I_2$ flows along the secondary circuit as indicated by the arrow therein. The energy is thus delivered to the output terminal and output with an output voltage $V_O$.

Figure 3B:
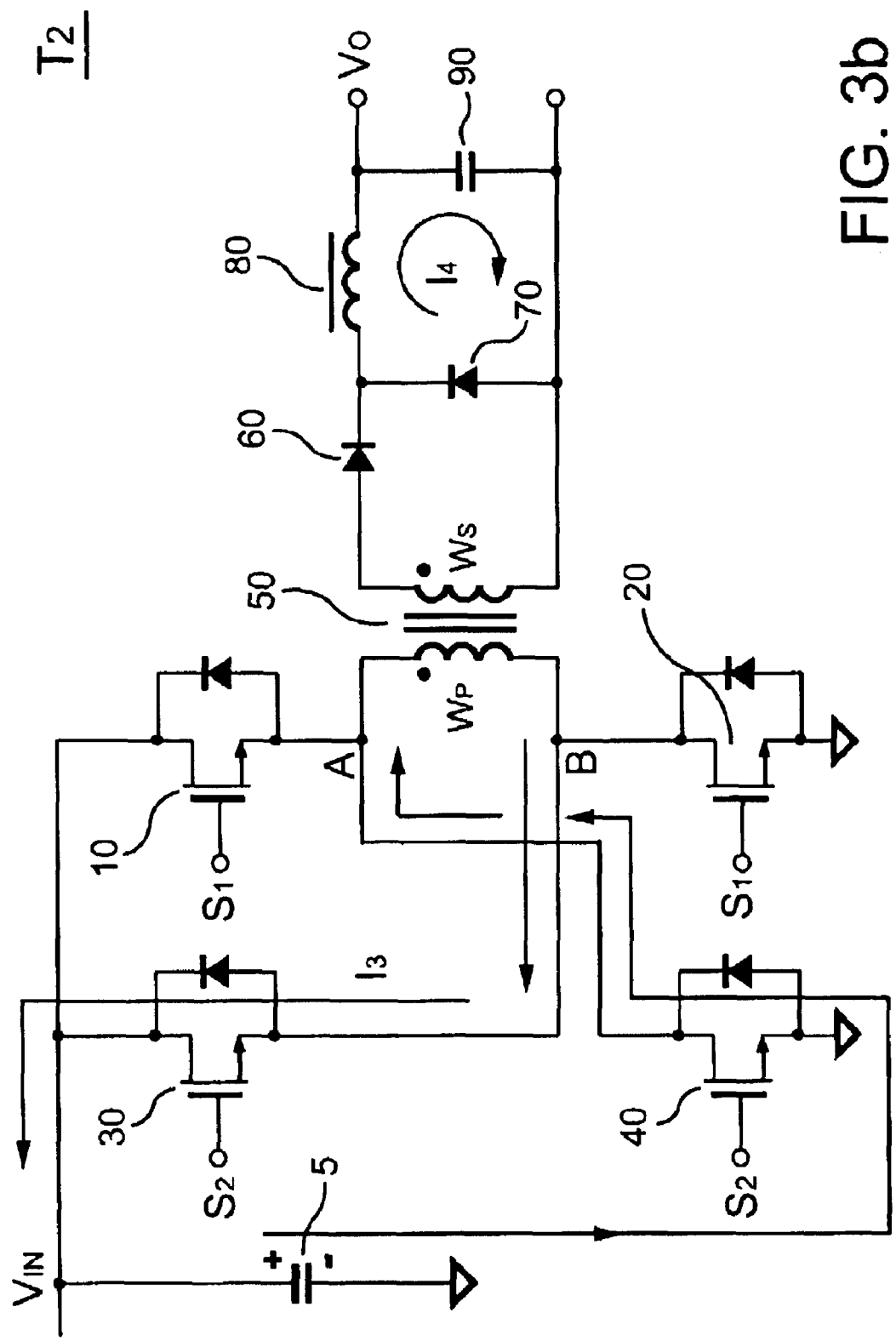
FIG. 3b shows the current flow of the soft-switching power converter as shown in FIG. 1 in a second operation stage of one switching cycle.

After $T_1$, the switching signal $S_1$ drops to zero or a lower voltage to switch off the main switches 10 and 20 in the second operation stage as shown in FIG. 2. Referring to FIG. 3b, the primary current $I_1$ is cut off. However, before the auxiliary switches 30 and 40 are switched on by the switching signal $S_2$, a current $I_3$ is induced flowing from the primary winding Wp to the input voltage source via the parasitic diodes of the auxiliary switches 30 and 40 in the second operation stage shown in FIG. 3b. As a result, the rectifying diode 60 in the secondary winding Ws is reverse biased and cut off, the diode 70 is forward biased and conducted, and a closed loop between the inductor 80 and the capacitor 90 is formed. Therefore, the secondary winding Ws becomes an open circuit, and the energy stored in transformer 50 is reset and freewheeled back to the input voltage source $V_{IN}$ through the parasitic diodes of the auxiliary switches 30 and 40. Meanwhile, the energy is stored in the inductor 80 and the capacitor 90 is continuously delivered to the output terminal of the secondary circuit, and a current $I_4$ is generated and circulates in the closed loop as indicated by the arrow in the secondary circuit in FIG. 3b. Further, as shown in FIG. 2, the duration $T_2$ of the second operation stage can be extended until all the energy stored in the transformer 50 is released. The variable duration of the second operation stage is indicated as $T_R$ in FIG. 2.

Figure 3C:
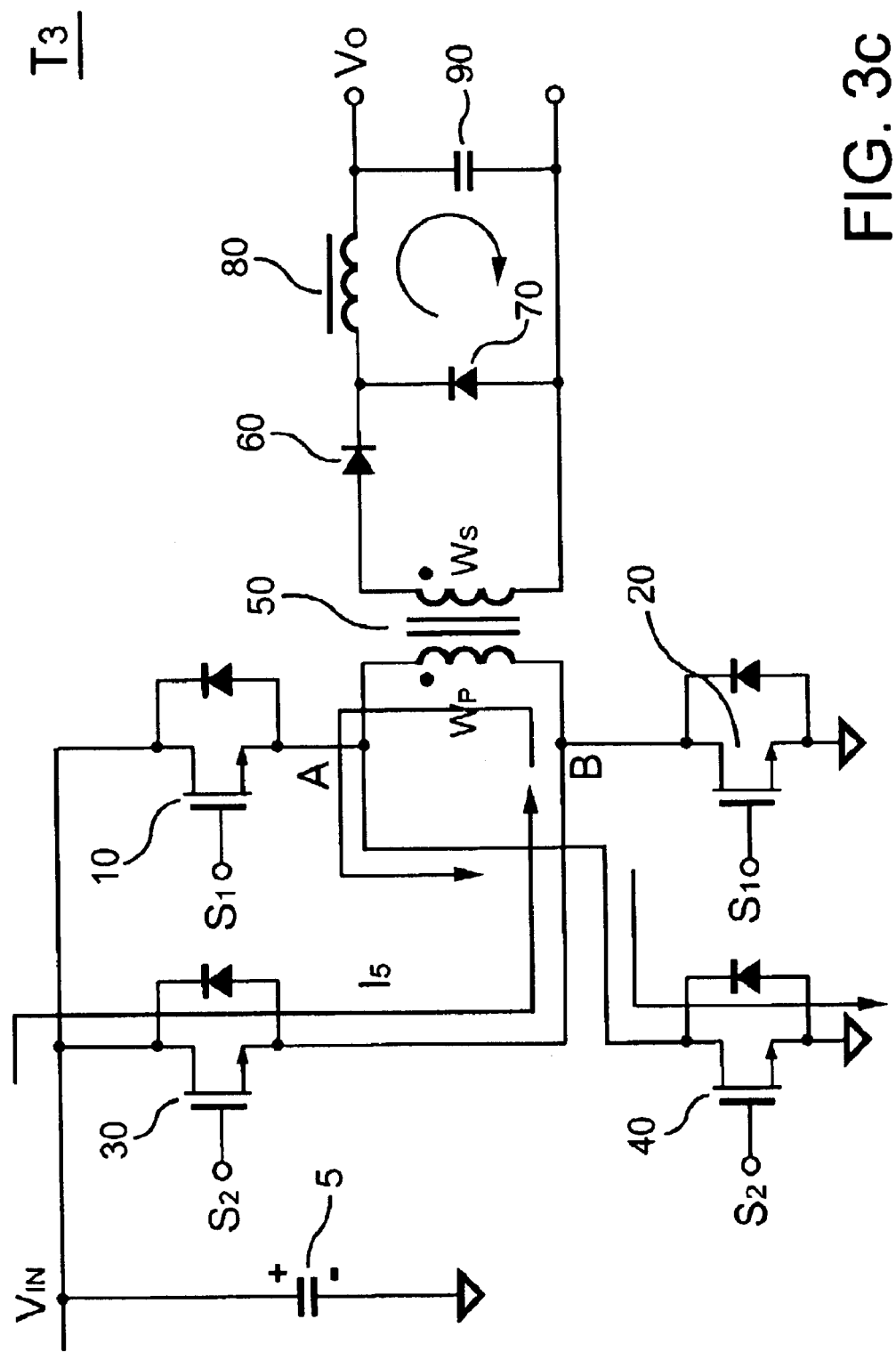
FIG. 3c shows the current flow of the soft-switching power converter as shown in FIG. 1 in a third operation stage of one switching cycle.

FIGS. 2 and 3c show the third operation stage in each switching cycle of the soft-switching power converter. As shown in FIG. 2, before starting the next switching cycle, that is, before the main switches 10 and 20 are switched on by the switching signal $S_1$ again, the switching signal $S_2$ switches on the auxiliary switches 30 and 40. As shown in FIG. 3c, the current $I_5$ is directed to flow through the primary winding Wp from the node B to the node A, and energy is stored into the transformer 50. In the primary circuit, the current $I_5$ flows along a direction reverse to the current $I_3$ generated in the second operation stage. With regard to the secondary circuit, similar to the second operation stage, the direction of the current flow $I_5$ results in a reverse bias of the rectifying diode 60, so that the secondary winding Ws becomes an open circuit. The transformer 50 thus operates as an inductor in this operation stage. As the secondary winding Ws is an open circuit and no current flows therethrough, the zero-current switching (ZCS) or zero-voltage switching (ZVS) of the auxiliary switches 30 and 40 can be realized. The soft-switching power converter is thus operated similar to a discontinuous-mode flyback power converter under such circumstance. Therefore, the energy stored into the transformer 50 in the third operation stage can be expressed as:

$$\in = Lp \times Ip^2/2,$$

where Lp is the inductance of the primary winding Wp, and Ip is the current flowing through the primary winding Wp and can be expressed as:

$$Ip = V_{IN} \times T_3/Lp,$$

where $T_3$ is the turn-on time of the auxiliary switches 30 and 40. By substituting the equation of Ip into the equation of the energy $\in$, $$\in = V_{IN}^2 \times T_3^2/(2 \times Lp).$$

Figure 3D:
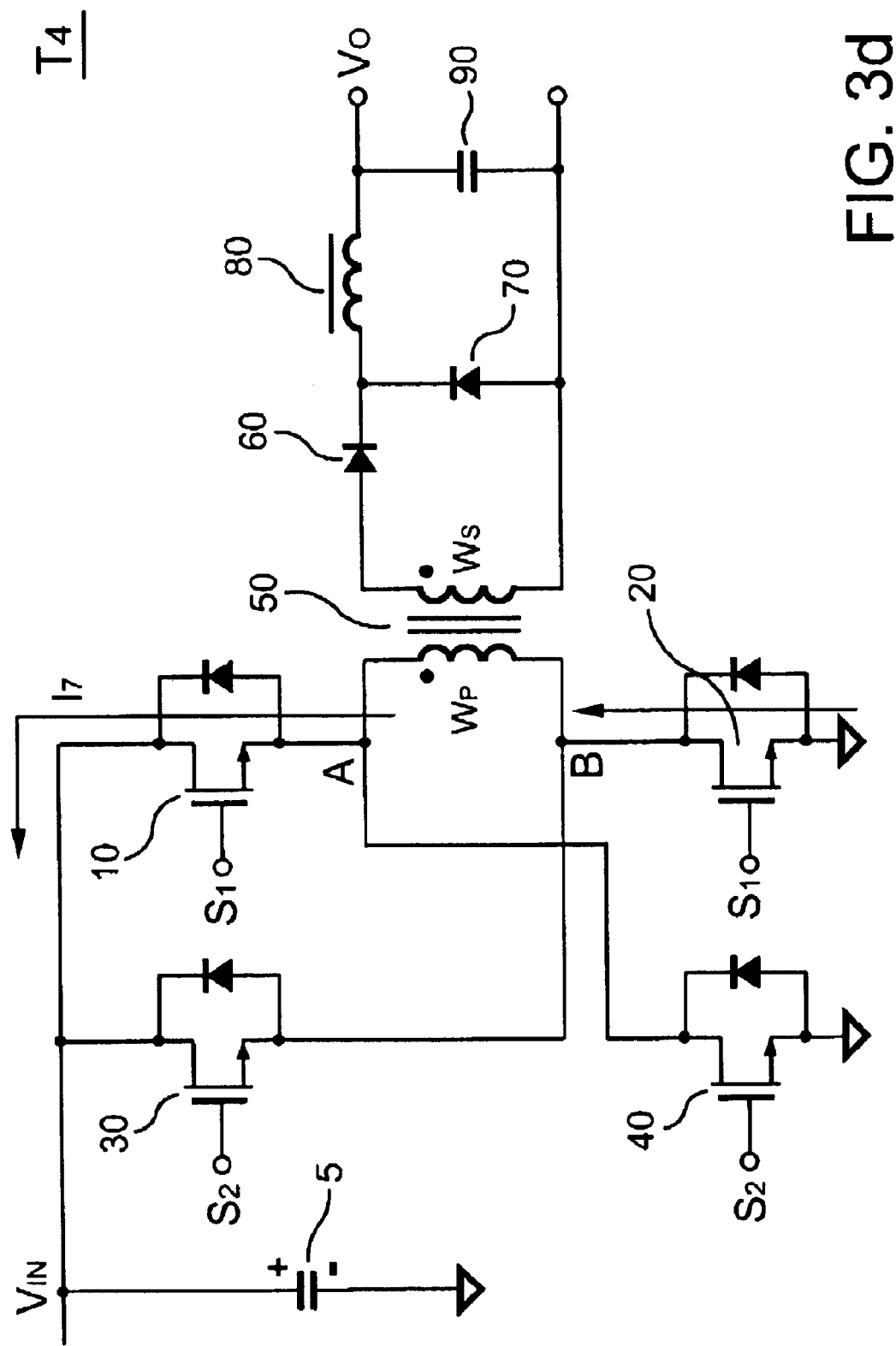
FIG. 3d shows the current flow of the soft-switching power converter as shown in FIG. 1 in a fourth operation stage of one switching cycle.

In the fourth operation stage as shown in FIG. 2 and FIG. 3d, the switching signal $S_2$ drops to zero or low voltage to switch off the auxiliary switches 30 and 40, while the switching signal $S_1$ stays low or zero keeping the main switches 10 and 20 off. The current $I_5$ is thus cut off from the primary winding Wp. Meanwhile, the energy generated in the period $T_3$ in the third operation stage and magnetizing the transformer 50 flies back to the input voltage source $V_{IN}$ through the parasitic diodes of the main switches 10 and 20. Consequently, a current $I_7$ flowing in a direction opposite to the current $I_1$ generated in the first operation stage is generated. This realizes a zero-voltage transition.

To generate the current $I_7$ flowing through the main switches 10 and 20 and to realize the zero-voltage transition in this operation stage, the parasitic diodes of the main switches 10 and 20 have to be switched on. Moreover, to switch on the parasitic diodes of the main switches 10 and 20, the parasitic capacitors thereof have to be discharged first. Therefore, to achieve the zero-voltage transition, the following inequality has to be satisfied:

$$V_{IN}^2 \times T_3^2/(2 \times Lp) > 2 \times (Cr \times V_{IN}^2/2)$$

where Cr is the parasitic capacitance of the main switches 10 and 20. As the resonant frequency fr between the primary winding Wp and the parasitic capacitors of the main switches 10 and 20 can be expressed as:

$$fr = 1/(2\pi \times (Lp \times Cr)^{1/2}).$$

the minimum transfer time $T_F$ to achieve the phase shift for zero-voltage transition is $$T_F = 1/(4 \times fr) = \pi \times (Lp \times Cr)^{1/2}/2$$

That is, the minimum time from the switching signal $S_2$ dropping low to switch off the auxiliary switches 30 and 40 to the time the main switches 10 and 20 are being switched on again by the switching signal $S_1$, namely, the minimum duration of the fourth stage can be calculated by the above equation of $T_F$. From the above equation, it is known that the minimum time required for achieving the zero-voltage transition is determined by the inductance of the primary winding Wp and the parasitic capacitance Cr.

The duration of the fourth operation stage can be delayed by a delay time $T_Z$ after the parasitic diodes of the main switches 10 and 20 are conducted and before starting the next switching cycle. Therefore, the total duration of the fourth operation stage is the sum of the minimum transfer time $T_F$ and the delay time $T_Z$, that is, $T_4 = T_F + T_Z$. However, in order to operate the inductor 80 in a continuous mode under the condition of zero-voltage transition, the energy stored in the transformer 50 in the duration $T_3$ of the third operation stage must satisfy the following inequality:

$$V_{IN}^2 \times T_3^2/(2 \times Lp) > \{[Cr \times VIN^2] + [V_{IN} \times (Ns/Np) \times I_O \times T_Z] + [T_Z \times V_{IN}^2 \times T_3/Lp]\},$$

where Ns and Np are turns of the secondary and primary windings Ws and Wp, respectively, and $I_O$ is the output current of the power converter. That is, the energy stored in the transformer 50 in the duration $T_3$ has to be large enough to discharge the parasitic capacitance 2Cr, and then provide the primary side backward freewheeling current and sustain the output current during the delay time $T_Z$.

Further, to optimize the soft-switching operation, the delay time $T_Z$ has to be minimized to save energy. Once the controller 100 detects the zero-voltage transition in the fourth operation stage via the diode 105, the main switches 10 and 20 are switched on instantaneously by the switching signal $S_1$. Therefore, the delay time $T_Z$ can be minimized, and the soft-switching operation is optimized.

Figure 4:
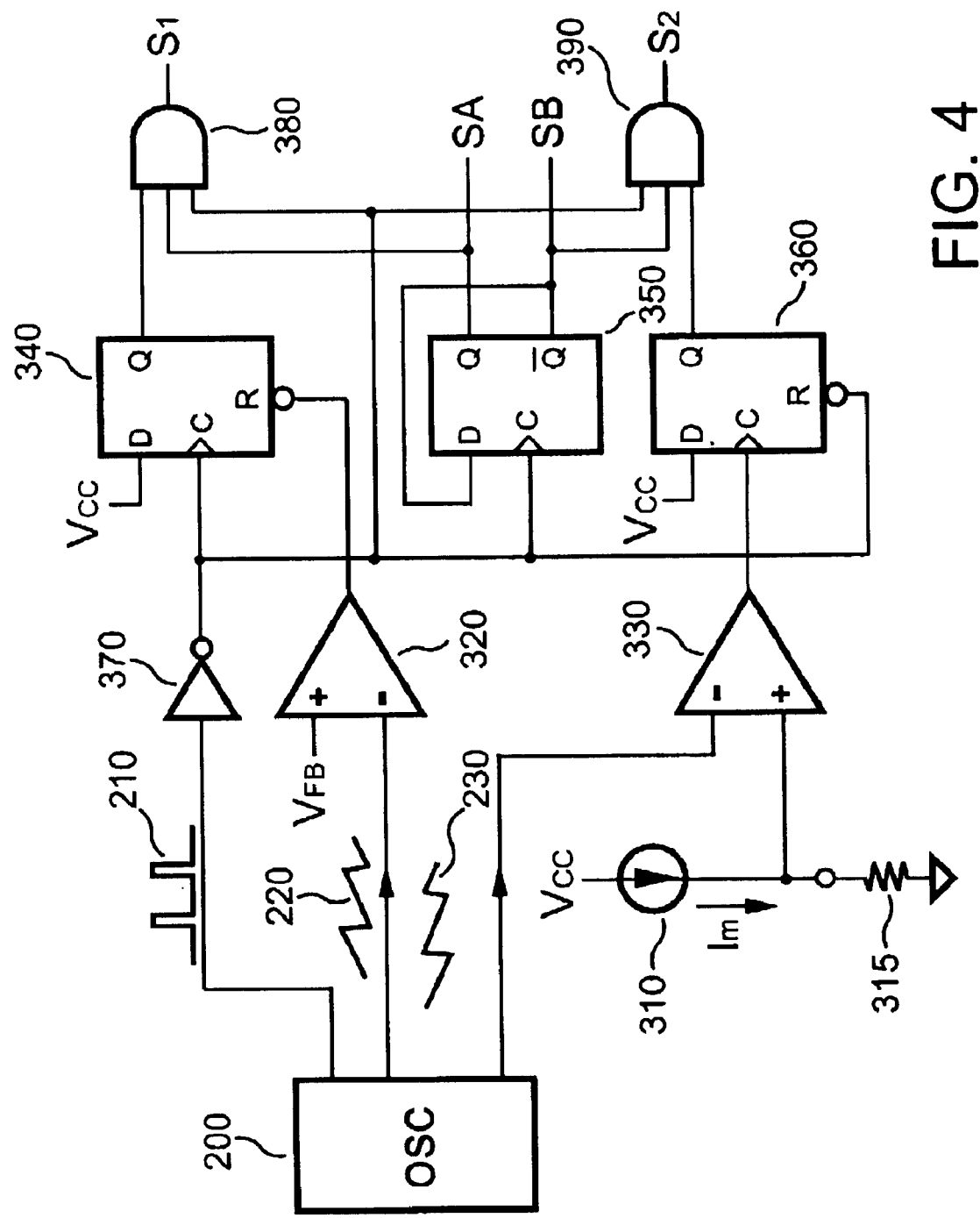
FIG. 4 is a circuit diagram of the controller of the soft-switching power converter as shown in FIG. 1.

FIG. 4 shows a circuit diagram of the controller 100 for generating the switching signals $S_1$ and $S_2$. As shown in FIG. 4, the controller 100 includes an oscillator 200, an inverter 370, comparators 320 and 330, a variable current source 310, D-type flip-flops 340, 350 and 360, and AND gates 380 and 390. The oscillator 200 is coupled to the input of the inverter 370, the negative inputs of the comparators 320 and 330. The output of the inverter 370 is coupled to the D-type flip-flops 340, 350, 360, and the inputs of the AND gates 380 and 390. The D-type flip-flop 340 is further coupled to a voltage source Vcc and the output of the comparator 320, while the output thereof is coupled to the AND gate 380. Enable signals $S_A$ and $S_B$ output by the D-type flip-flop 350 are inverted from each other and fed into the AND gates 380 and 390, respectively. The D-type flip-flop 360 is further coupled to the output of the comparator 330 and the voltage source Vcc, while the output thereof is coupled to the input of the AND gate 390. From the AND gates 380 and 390, the switching signals $S_1$ and $S_2$ are output to drive the main switches 10, 20 and the auxiliary switches 30, 40, respectively.

Figure 10:
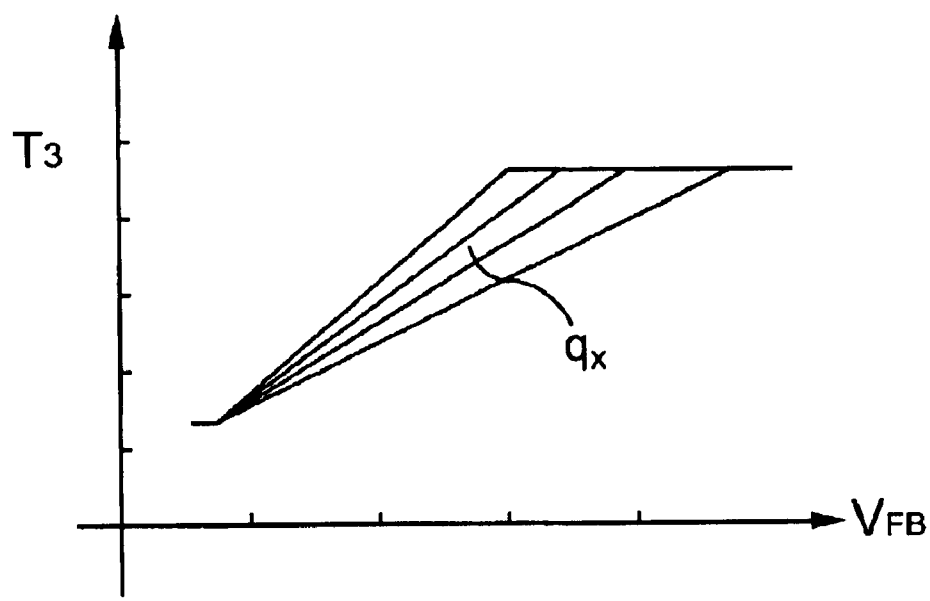
FIG. 10 shows the switching signal applied to the auxiliary switches as a function of the load.

As shown in FIG. 4, the D-type flip flop 350 provides enable signals $S_A$ and $S_B$ to the AND gates 380 and 390, respectively, so as to ensure that the main switches 10, 20 and the auxiliary switches 30 and 40 as shown in FIG. 1 are driven at separate phases and slightly less than 50% of the maximum duty cycle. The oscillator 200 is operative to generate a clock signal 210, a ramp signal 220 and a raw signal 230. The clock signal 210 determines the pulse width modulation switching frequency of the power converter and provides the off-time (dead time) between the pulses of the switching signals $S_1$ and $S_2$, so as to achieve the phase shift of the zero-voltage transition. The feedback voltage $V_{FB}$ reflecting the output voltage $V_O$ of the power converter is compared to the ramp signal 220 in the comparator 320. When the feedback voltage $V_{FB}$ is high, the pulse width $T_1$ of the switching signal $S_1$ is broadened, and more power is forwarded to the output of the power converter. Therefore, the feedback voltage $V_{FB}$ sourced from the output voltage $V_O$ can be used to regulate the output voltage $V_O$. The feedback voltage $V_{FB}$ is compared to a ramp signal 220 generated by the oscillator 200 in the comparator 320. The saw signal 230 generated by the oscillator 200 is synchronized with the ramp signal 220, while the amplitude thereof is inversely proportional to that of the ramp signal 220. The variable current source 310 generates a variable current Im as a function of the feedback voltage $V_{FB}$ flowing through the resistor 315, thus resulting in a variable voltage across the resistor 315. The saw signal 230 is compared to the variable voltage generated by the variable current source 310 in the comparator 330. By adjusting the variable current Im, the variable voltage across the resistor 315 is programmable, such that the pulse width $T_3$ of the switching signal $S_2$ can be programmed or adjusted. As the feedback voltage is increased in accordance with the increase of the load, variable current Im will raise and the pulse width $T_3$ of the switching signal $S_2$ will be broadened, as shown in FIG. 10.

Figure 7:
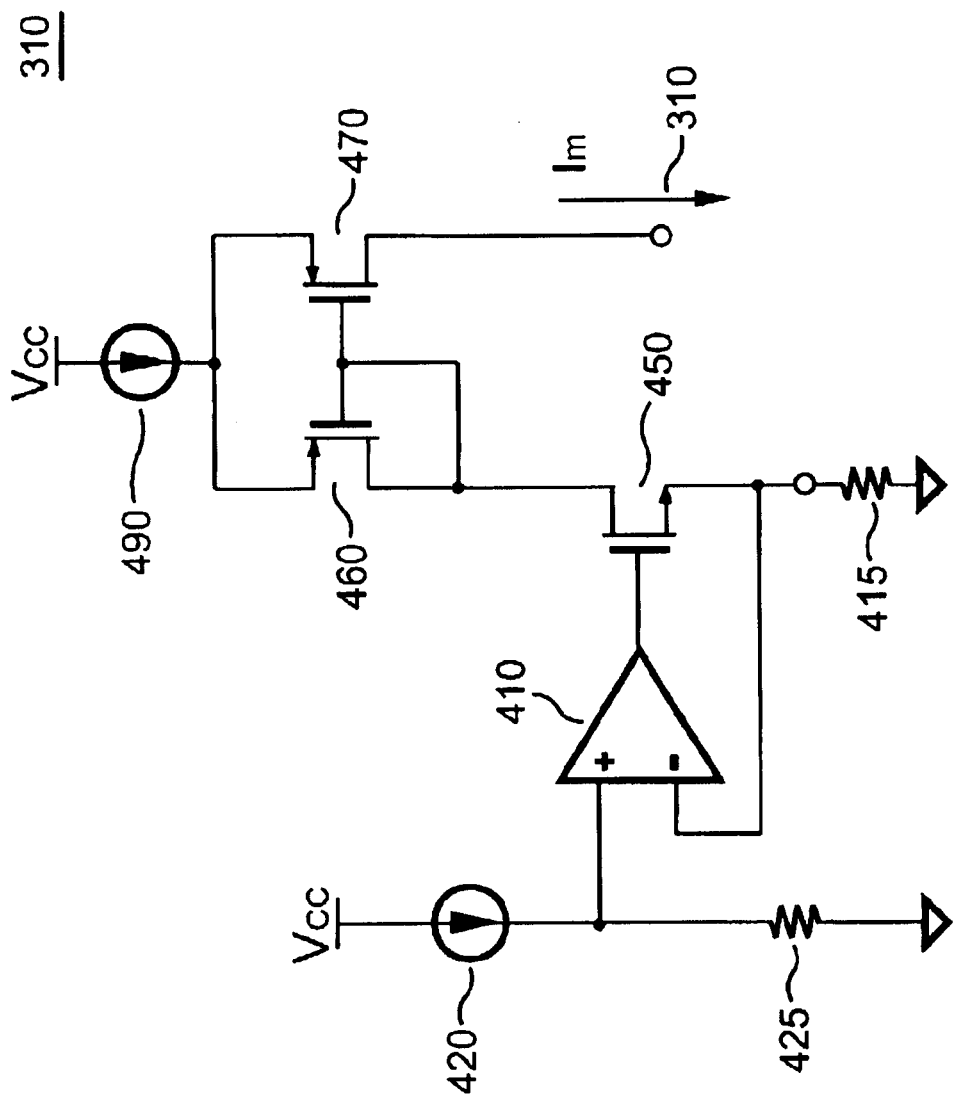
FIG. 7 shows the circuit for generating a variable current that determines the pulse width of the switching signal applied to the auxiliary switches of the soft-switching power converter as shown in FIG. 1.

The variable current source 310 shown in FIG. 7 comprises a programmable current source 420, a resistor 425, an op-amplifier 410, a current source 490, a pair of mirrored transistors 460, 470 and a transistor 450. The programmable current source 420 flows through the resistor 425 generating a voltage that is connected to the positive input terminal of the op-amplifier 410. The negative input terminal of the op-amplifier 410 is connected to the transistor 450 and the programming resistor 415 to generate a current in accordance with the voltage of the resistor 425, wherein the programming resistor 415 determines the pulse width $T_3$ of the second switching signal S2 as a function of a load of the power converter. The pair of mirrored transistors 460, 470 is connected to the current source 490. The transistor 450 is coupled to the mirrored transistor 460. The mirrored transistor 470 outputs the variable current Im.

Figure 5:
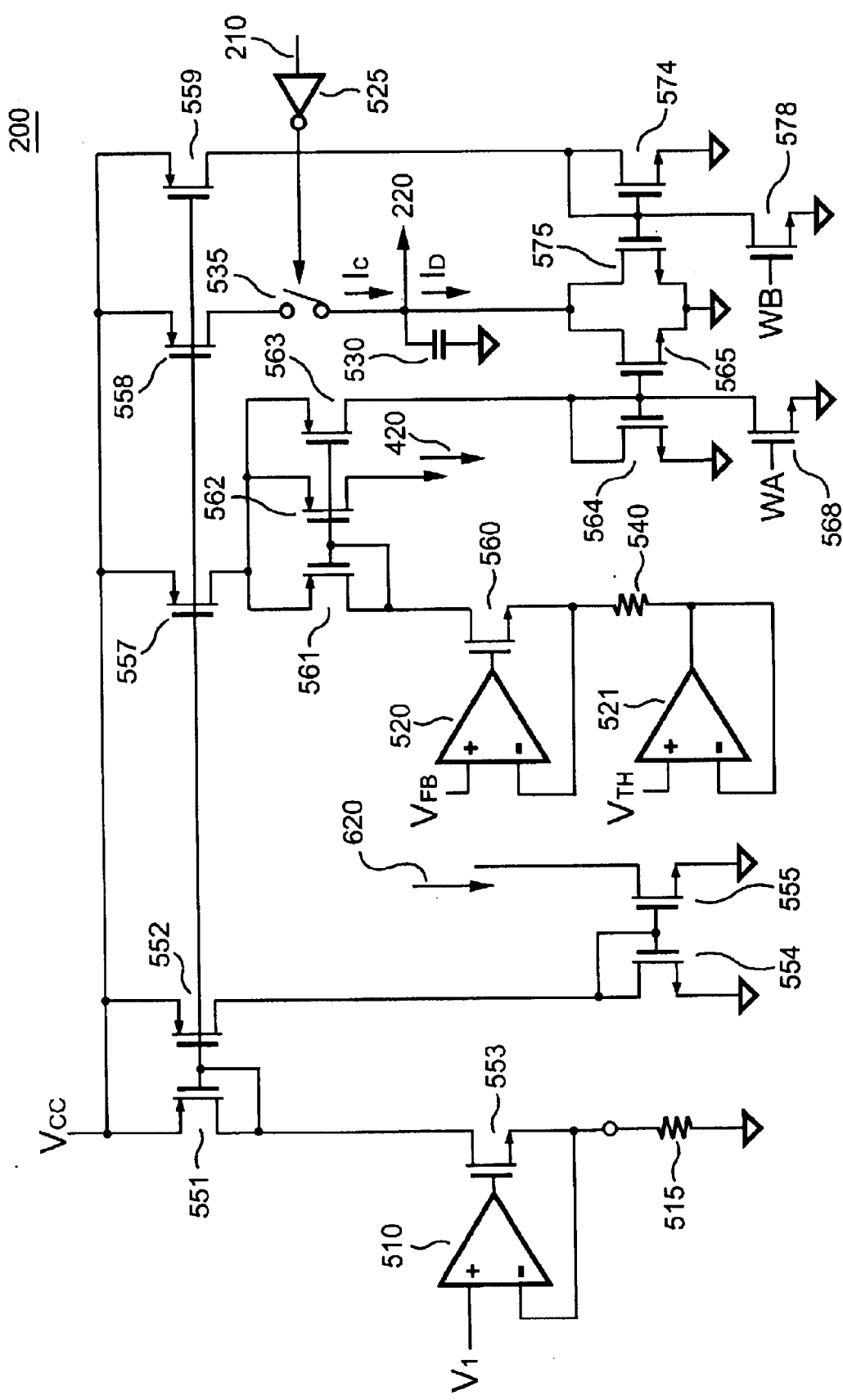
FIG. 5 and FIG. 6 show the circuits that generate a programmable clock signal to control the pulse width modulation frequency and the soft-switching operation of the soft-switching power converter as shown in FIG. 1.
Figure 6:
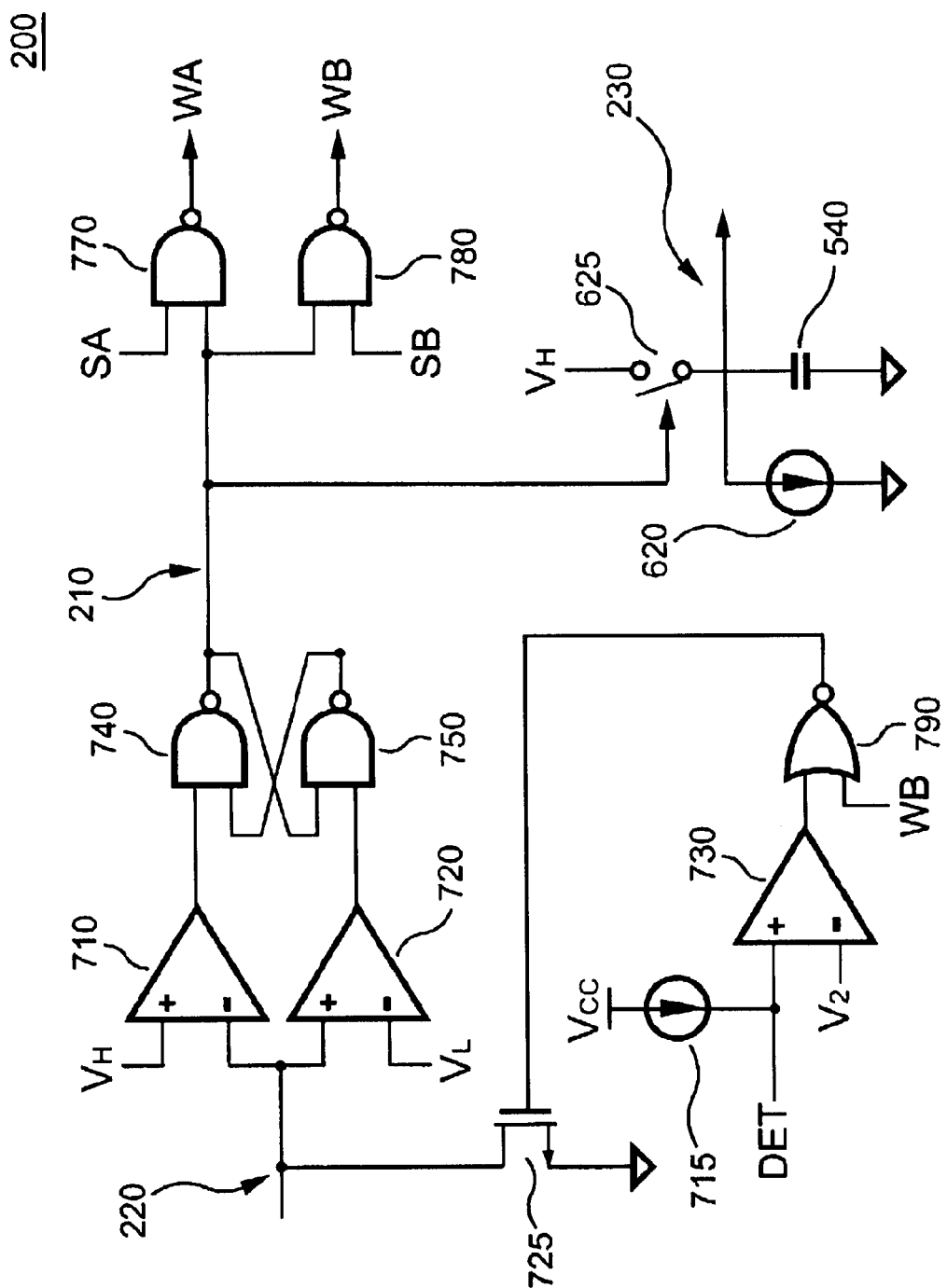

Referring to FIG. 5, the oscillator 200 comprises a reference voltage $V_1$, a transistor 551, a transistor 553 and an op-amplifier 510 to generate a reference current through the resistor 515. The op-amplifier 510 is coupled between the reference voltage $V_1$ the transistor 553 and the resistor 515. The transistor 553 is coupled to the transistors 551 to generate the reference current. The oscillator further comprises three mirrored transistors 561, 562, 563, a transistor 560, two op-amplifiers 520 and 521, a resistor 540 and a current source mirrored from the reference current by a transistor 557. The transistors 561, 562, 563 are connected to the transistor 557. The transistor 560 is coupled to the transistor 561. A positive terminal of the op-amplifier 520 is coupled to a feedback voltage $V_{FB}$, and a negative terminal of the op-amplifier 520 is coupled to the transistor 560. The resistor 540 is coupled to the transistor 560 and the op-amplifier 520. The op-amplifier 521 is coupled to the resistor 540 and a positive terminal of the op-amplifier 521 is coupled to a threshold voltage $V_{TH}$. The transistor 562 mirrors the programmable current 420 from the transistor 561. The transistor 563 mirrors a programmable discharge current from the transistor 561. The programmable current 420 and the discharge programmable current are proportional to a mirror ratio of the mirrored transistors 561, 562, 563 and the difference between the feedback voltage $V_{FB}$ and the threshold voltage $V_{TH}$, and inversely proportional to resistance of the resistor 540. Due to the feedback voltage $V_{FB}$ decreasing in response to the decrease of the output load of the power converter, therefore the programmable current 420 and the programmable discharge current are reduced in light load and no load conditions.

Figure 8:
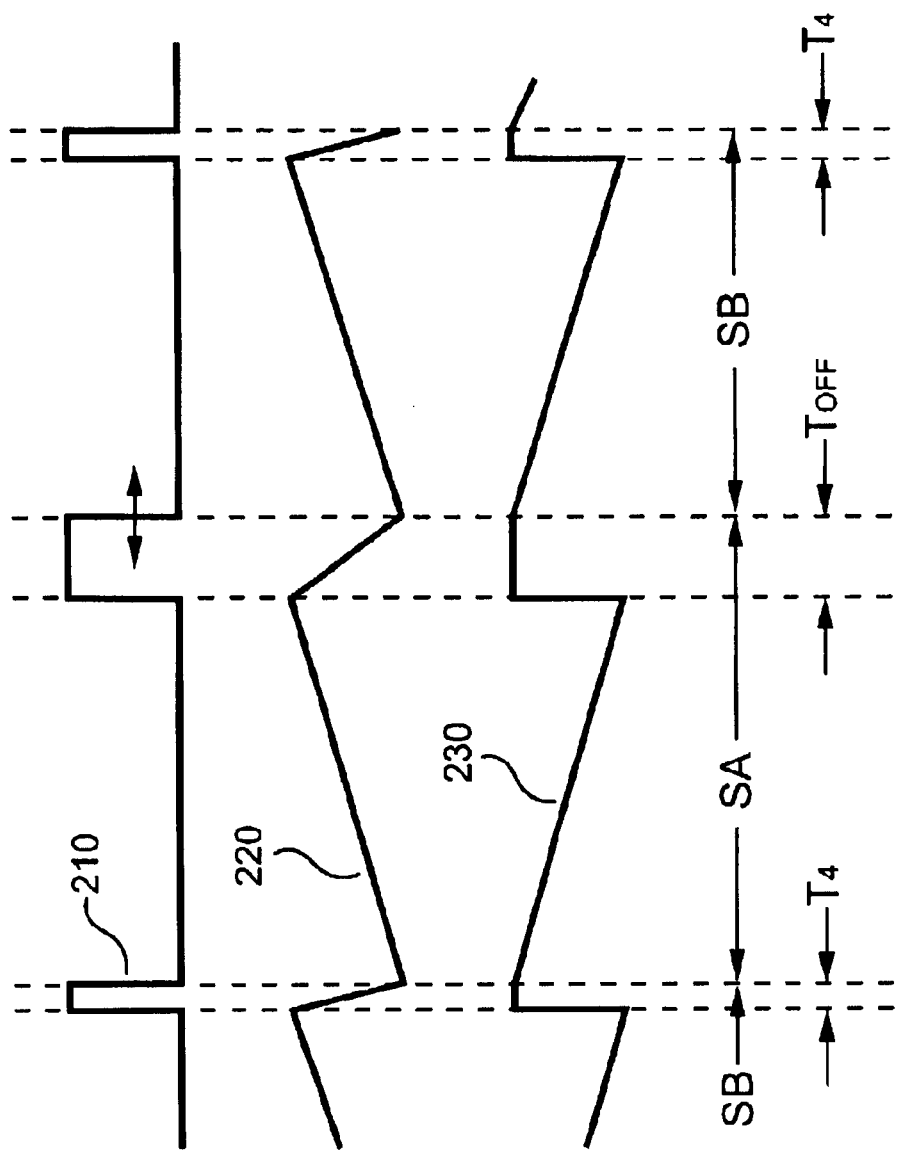
FIG. 8 shows the waveforms of the clock signal and the control signal as illustrated in FIG. 4.
Figure 9:
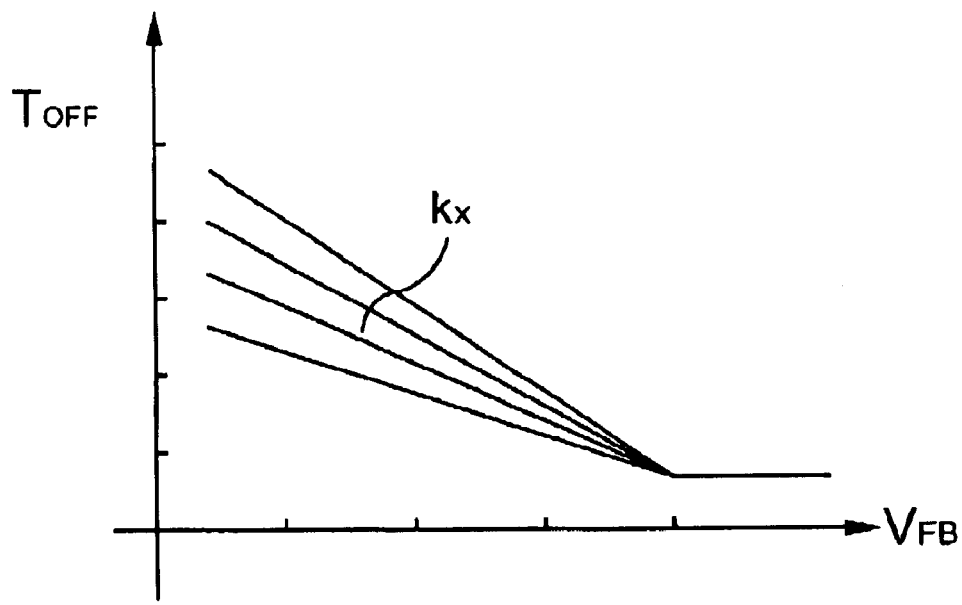
FIG. 9 shows the off-time of the switching signal applied to the main switches as a function of load.

The oscillator 200 further comprises a capacitor 530, operative to determine the operation frequency. A charge current Ic mirrored from the reference current associates with the capacitor 530 and is used to generate the ramp signal 220 and determine the maximum on-time of the first switching signal $S_1$. The oscillator 200 further comprises a first-pair of mirrored transistor 564, 565 and second-pair of mirrored transistor 574, 575, a first-disable transistor 568 and second-disable transistor 578 for the control of discharge current $I_D$. A discharge current mirrored from the reference current by a transistor 559 flows through the second-pair of mirrored transistors 574, 575 to discharge the capacitor 530. The discharge current $I_D$ is enabled by a second discharge signal WB via the second-disable transistor 578. The discharge current $I_D$ associates with the capacitor 530 to determine off-time $T_{OFF}$ of the second switching signal $S_2$. The programmable discharge current that mirrored from the transistor 563 flows through the first-pair of mirrored transistor 564, 565 discharges the capacitor 530. The programmable discharge current is enabled by a first discharge signal WA via the first-disable transistor 568. The programmable discharge current associates with the capacitor 530 to determine off-time $T_{OFF}$ of the first switching signal $S_1$. Since the programmable discharge current is reduced in accordance with the decrease of the load in light load condition, the off-time $T_{OFF}$ of the first switching signal $S_1$ is increased accordingly, as shown in FIG. 9. In the mean time the off-time of the second switching signal $S_2$ is kept as a constant, which maintains a short delay time $T_4$ for achieving the zero voltage transition before the start of the next switching cycle as shown in FIG. 8. Consequently, the off-time $T_{OFF}$ of the first switching signal $S_1$ is increased, the switching frequency of the switching signal is decreased and thus the switching losses and the power consumption of the power converter is reduced in light load and no load conditions.

The switching frequency of the oscillator Freq is the inverse of the period expressed as:

$$Freq=1/T=1/(2 \times T_{ON}+T_{OFF}+T_4),$$

where in each switching cycle, the transformer 50 is conducted to the input voltage source $V_{IN}$ twice, once via the main switches 10 and 20, and once via the auxiliary switches 30 and 40, such that each period T includes two on-times, which is expressed as $2 \times T_{ON}$ ($T_1$ and $T_3$). In addition, the main and auxiliary switches 10 to 40 are also switched twice in each period, that is, one off-time denoted by $T_{OFF}$, and the other off-time $T_4$.

The on-time, off-time and $T_4$ can be derived from the capacitance 530 ("Cc"), the voltage drop across the capacitor 530, and the current flowing therethrough as:

$$T_{ON}=Cc \times (V_H-V_L)/I_C$$

where Ic is the charging current of the capacitor 530;

$$T_{OFF}=Cc \times (V_H-V_L)/Id\text{-}A$$

where Id-A is discharging current flowing through the capacitor 530 supplied from the transistors 564, 565 and 568 under the control of the signal WA;

$$T_4=Cc \times (V_H-V_L)/Id\text{-}B$$

Where Id-B is the discharging current of the capacitor 530 within $T_4$, the duration of the fourth operation stage, supplied from the transistors 574, 575 and 578 under the control of the signal WB.

Further, the charging current Ic and the discharging current Id-A and Id-B can be expressed as:

$$Ic=(V_1/R_{515}) \times K1,$$

where $V_1$ is the reference voltage, and $K1=N_{558}/N_{551}$, which is the geometry ratio of the transistor 558 to the transistor 551;

$$Id\text{-}A=[(V_{FB}-V_{TH})/R_{540}] \times K2$$

where $(V_{FB}-V_{TH})$ is the voltage drop across the resistor 540, while $K2=(N_{563}/N_{561}) \times (N_{565}/N_{564})$, which is determined by the geometry ratios of the transistor 563, 561 and the transistor 565, 564; and $$Id\text{-}B=(V_1/R_{515}) \times K3$$

where $K3=(N_{559}/N_{551}) \times (N_{575}/N_{574})$, which is the product of the geometry ratios of the transistor 559, 551, and the transistor 575, 574.

The oscillator 200 further comprises three comparators 710, 720, 730, four NAND gates 740, 750, 770, 780, a NOR gate 790, a transistor 725, a current source 715, a switch 625, a capacitor 540, and a release current 620 that is mirrored by the reference current. The negative input terminal of comparator 710, and the positive input terminal of comparator 720 are connected to the capacitor 530. In order to determine the switching frequency and the ramp signal 220, the positive input terminal of comparator 710 and the negative input terminal of comparator 720 are connected to a high threshold voltage $V_H$ and low threshold voltage $V_L$ respectively. The NAND gates 740, 750 form a S-R latch circuit. The input of the NAND gate 740 and 750 is connected to the output of the comparator 710 and 720 respectively. The NAND gate 740 outputs a clock signal 210 that is connected to the input of NAND gates 770 and 780. The first and second enable signal Sa and SB are applied to NAND gates 770 and 780 respectively to generate the first discharge signal WA and the second discharge signal WB for the off-time control of the first and second switching signal $S_1$ and $S_2$. The clock signal 210 is also applied to turn on the switch 625, which associates with the release current 620 and the capacitor 540 to produce the saw signal 230 as shown in FIG. 8. Accordingly, the saw signal 230 is used to compare with the variable voltage to generate the signal for the second switching signal $S_2$. The positive input terminal of the comparator 730 is connected to the current source 715 and the detection diode 105 for the detection of zero voltage transition. The current source 715 is used for the pull-high. The negative input terminal of the comparator 730 is coupled to a threshold voltage $V_2$. Once a low signal is detected by the comparator 730, during the period of second switching signal $S_2$, the transistor 725 will be turned on by the NOR gate 790 to rapidly discharge the capacitor 530 in order to start the next switching cycle in time. Therefore the zero voltage switching is achieved and the efficiency of the power converter is improved.

As shown in FIG. 9, in response to the decrease of the feedback voltage $V_{FB}$, the duration $T_{OFF}$ for turning off the main switches 10, 20 are increased with a slope $k_x$ until reaching a minimum value $T_{min}$. It can be expressed as $$T_{OFF}=k_x \div (IV_{FB}-V_{TH}I)$$

where $T_{OFF}>T_{min}>0$

In contrast, as shown in FIG. 10, the duration for switching on the auxiliary switches 30, 40, that is, the pulse width thereof $T_3$, is increased with a slope $q_x$ until reaching a maximum value $T_{mas}$. The resistance of the resistor 315, 415 determines the slope $q_x$. It can be stated as $$T_3=q_x \times (V_{FB}-V_{TH})$$

$$q_x=(R_{315}/R_{415}) \times K5$$

where the K5 is a constant.

In the proposed circuit, the main switches and auxiliary switches operate with ZVS and ZCS, respectively. Compared with the soft-switching prior arts, the extra magnetic devices or the leakage inductance of the transformer is not needed. The switching loss, stress and noise are thus reduced. Furthermore, due to the switching frequency being decreased, the power consumption of the power converter in light load condition is additionally reduced.

It will be apparent to those skilled in the art that various modifications and variations can be made to the structure of the present invention without departing from the scope or spirit of the present invention. In view of the foregoing, it is intended that the present invention cover modifications and variations of the present invention provided that they fall within the scope of the following claims and their equivalents.

What is claimed is:

1. A soft-switching power converter, comprising:
a transformer, having a primary winding and a secondary winding;
a primary circuit, coupled to the primary winding, wherein the primary circuit further comprises a pair of main switches and a pair of auxiliary switches,
a secondary circuit, coupled to the secondary winding;
a feedback circuit, coupled to an output of the secondary circuit to generate a feedback voltage;
a controller, coupled to feedback voltage and the primary circuit, the controller being operative to conduct the primary winding to an input voltage source in response to the feedback circuit, wherein the controller is operative to generate a first switching signal and a second switching signal out of phase with each other to drive the main and auxiliary switches, respectively; and
a detection diode connected between the main switches and the controller, wherein the detection diode is operative to generate a detection signal output to the controller upon detection of a zero-voltage transition condition of the transformer.

2. A soft-switching power converter, comprising:
a transformer, having a primary winding and a secondary winding;
a primary circuit, coupled to the primary winding, wherein the primary circuit further comprises a pair of main switches and a pair of auxiliary switches,
a secondary circuit, coupled to the secondary winding;
a feedback circuit, coupled to an output of the secondary circuit to generate a feedback voltage;
a controller, coupled to feedback voltage and the primary circuit, the controller being operative to conduct the primary winding to an input voltage source in response to the feedback circuit, wherein the controller is operative to generate a first switching signal and a second switching signal out of phase with each other to drive the main and auxiliary switches, respectively;
a timing resistor coupled to the controller to adjust a pulse width of the second switching signal;
a programming resistor coupled to the controller to determine a pulse width of the second switching signal as a function of a load of the power converter; and
a reference resistor to adjust a switching frequency of the power converter.

3. A power converter, comprising:
a transformer, having a primary winding and a secondary winding;
a primary circuit, coupled to the primary winding, further comprising:
a first main switch, connected to an input voltage source and a first terminal of the primary winding;
a second main switch, connected to a second terminal of the primary winding, for receiving a first switching signal;
a first auxiliary switch, connected to the input voltage source and the secondary terminal of the primary winding;
a second auxiliary switch, connected to the first terminal, for receiving a second switching signal;
a controller, operative to generate the first and second switching signals; and
a detection diode coupled between the primary winding and an detection input of the controller to detect transition state of the transformer;
a feedback circuit operative to generate a feedback voltage to the controller in response to an output voltage of the power converter;
a secondary circuit, connected between the secondary winding and an output of the power converter, wherein the secondary circuit further comprises:
a half-bridge rectifier, coupled to the secondary winding;
an inductor, coupled to the half-bridge rectifier; and
a capacitor, coupled to the inductor.

4. The power converter as claimed in claim 3, wherein the power converter operates in a plurality of operation stages, comprising:
in a first operation stage, the controller is operative to generate the first switching signal to conduct the input voltage source and the primary winding via the main switches, wherein while the first switching signal being generated, a current is conducted and flows from the first terminal of the primary winding to the second terminal of the primary winding via the first and second main switches;
in a second operation stage, the first switching signal being switched off to disconnect the input voltage source and the primary winding, wherein the first switching signal being switched off, a current flow is induced from the primary winding to the input voltage source via the first and second auxiliary switches;
in a third operation stage, the second switching signal being generated to conduct the input voltage source to the primary winding via the auxiliary switches, wherein the second switching signal being generated, a current is conducted and flows from the second terminal of the primary winding to the first terminal of the primary winding via the first and second auxiliary switches; and
in a fourth operation stage, the second switching signal being switched off to disconnect the input voltage source and the primary winding, wherein while the second switching signal is switched off, a current is induced and flows from the primary winding to the input voltage source via the first and second main switches.

5. The power converter as claimed in claim 3, wherein the controller further comprises:
an oscillator, operative to generate a clock signal, a ramp signal and a saw signal;
a plurality of D-type flip-flops, operative to generate a first output in response to the clock signal, a feedback voltage generated in response to an output voltage of the power converter and the ramp signal, a second output in response to the clock signal and the saw signal, and a variable voltage generated in response to a variable current and the timing resistor; and
two AND gates, operated to generate the first and second switching signals in response to the first output and the second output respectively, wherein the pulse width of the second switching signal is adjusted by the variable voltage.

6. A controller, suitable for use in a power converter comprising a transformer to control conduction of an input voltage source and the transformer, the controller comprising:

an oscillator, operative to generate a clock signal, a ramp signal and a saw signal;

an inverter, with an input terminal receiving the clock signal and an output terminal;

a first comparator, with a positive terminal connected to a feedback voltage obtained from an output voltage of the power converter, a negative terminal coupled to the ramp signal, and an output terminal;

a second comparator, with a positive terminal coupled to the variable current and the timing resistor, a negative terminal coupled to the saw signal, and an output terminal;

a first D-type flip-flop, coupled to the output terminals of the inverter and the first comparator and a voltage source, the first D-type flip flop further comprising an output;

a second D-type flip-flop, coupled to the output terminals of the inverter and the second comparator and the voltage source, the second D-type flip-flip further comprising an output;

a third D-type flip-flop, coupled to the output terminal of the inverter, the third D-type flip-flop having a first output and a second output inverted from the first output;

a first AND gate, coupled to the outputs of the first D-type flip-flop and the inverter, and a first output of the third D-type flip-flop; and a second AND gate, coupled to the outputs of the second D-type flip-flop and the inverter, and the second output of the third D-type flip-flop.

7. The controller as claimed in claim 6, wherein the first AND gate is operative to generate a first switching signal to drive the main switches, and the second AND gate is operative to generate the second switching signal to drive the auxiliary switches.

8. The controller as claimed in claim 6, further comprising a variable current source to generate the variable current, wherein the variable current is adjusted in response to the feedback voltage.

9. The controller as claimed in claim 8, wherein the variable current source further comprises:

an I/V resistor a programmable current generating a programmable voltage through the I/V resistor;

a constant current source;

a pair of mirrored transistors connected to the constant current source;

a transistor coupled to one of the mirrored transistors; and an op-amplifier coupled between the transistor and the programmable voltage generating the variable current through the programming resistor and mirrored transistor.

10. The controller as claimed in claim 6, wherein the oscillator comprises:

a reference voltage;

a mirrored transistor;

a transistor; and an op-amplifier, to generate a reference current through the reference resistor, wherein the op-amplifier is coupled between the reference voltage, the transistor and the reference resistor, and the transistor is coupled to one of the mirrored transistors to generate the reference current.

11. The controller as claimed in claim 6, wherein the oscillator further comprises:

three mirrored transistors;

a transistor;

a first and second op-amplifier;

a resistor; and a constant current source mirrored from the reference current, wherein the three mirrored transistors are connected to the constant current source, the transistor is coupled to the first one of the mirrored transistors, the first op-amplifier is coupled between the transistor and the feedback voltage, the resistor is coupled to the transistor and the first op-amplifier, the second op-amplifier is coupled to the resistor and a threshold voltage, the second one of the mirrored transistors outputs the programmable current, the third one of the mirrored transistors outputs a programmable discharge current, the programmable current and the programmable discharge current are proportional to a mirror ratio of the mirrored transistors and the difference between the feedback voltage and the threshold voltage, and inversely proportional to resistance of the resistor due to the feedback voltage being decreased in response to the decrease of the output load of the power converter, therefore the programmable current and the programmable discharge current are reduced in a light load condition and a no load condition.

12. The controller as claimed in claim 6, wherein the oscillator further comprises:

a frequency capacitor, operative to determine operation frequency, a charge current mirrored from the reference current, which associates with the frequency capacitor generate the ramp signal and determines the maximum on-time of the first switching signal;

a first-pair of mirrored transistor and a second-pair of mirrored transistor, a first-disable transistor and a second-disable transistor;

a discharge current mirrored from the reference current, in which the discharge current flows through the second-pair of mirrored transistors to discharge the frequency capacitor, wherein the discharge current is enabled by a second discharge signal via the second-disable transistor; wherein the discharge current associates with the frequency capacitor to determine the off-time of the second switching signal; the programmable discharge current that flows through the first-pair of mirrored transistors to discharge the frequency capacitor, wherein the programmable discharge current is enabled by a first discharge signal via the first-disable transistor; wherein the programmable discharge current associates with the frequency capacitor to determine the off-time of the first switching signal; the programmable discharge current is reduced in accordance with the decrease of the load in light load condition, thus the off-time of the first switching signal is increased accordingly; in the meantime the off-time of the second switching signal is kept as a constant, which maintains a short delay time for achieving the zero voltage transition before the start of next switching cycle; furthermore, when the off-time of the first switching signal is increased, the switching frequency of the switching signal is decreased.

13. The controller as claimed in claim 6, wherein the oscillator further comprises:

three comparators, wherein the negative input terminal of first comparator, and the positive input terminal of second comparator are connected to the frequency capacitor; in order to determine the switching frequency and the ramp signal, the positive input terminal of first comparator and the negative input terminal of second comparator are connected to a high threshold voltage and a low threshold voltage respectively;

four NAND gates, in which the first and second NAND gates form a S-R latch circuit; the input of the first and second NAND gate is connected to the output of the first and second comparator respectively; the first NAND gate outputs a clock signal that is connected to the input of third and fourth NAND gates; wherein the first and second enable signal is applied to the third and fourth NAND gates to generate the first discharge signal and the second discharge signal for the off-time control of the first and second switching signal;

a NOR gate;

a transistor;

a current source used for the pull-high;

a switch;

a capacitor; and a release current that is mirrored from the reference current; wherein the clock signal is applied to turn on the switch, which associates with the release current and the capacitor to produce the saw signal; the positive input terminal of the third comparator is connected to the current source and the detection diode for the detection of zero voltage transition; wherein the negative input terminal of the third comparator is coupled to a threshold voltage; once a low signal is detected by the third comparator, during the period of the second switching signal, the transistor will be turned on by the NOR gate to rapidly discharge the frequency capacitor and start the next switching cycle in time.

* * * * *